United States Patent [19]

Wunsche et al.

[11] Patent Number: 4,653,730
[45] Date of Patent: Mar. 31, 1987

[54] MULTI-PURPOSE PYROMETALLURGICAL PROCESS ENHANCING DEVICE

[75] Inventors: Edgar R. Wunsche; Alan A. Wunsche, both of Oshawa; Milan Kosanovich, Regina, all of Canada

[73] Assignee: Empco (Canada) Ltd., Oshawa, Canada

[21] Appl. No.: 675,205

[22] Filed: Nov. 27, 1984

[51] Int. Cl.$^4$ .............................................. C21C 5/30
[52] U.S. Cl. ...................... 266/47; 266/225; 266/226; 266/268; 373/80
[58] Field of Search ............... 266/47, 200, 214, 225, 266/226, 267, 268; 373/80

[56] References Cited

U.S. PATENT DOCUMENTS

| 3,212,882 | 10/1965 | Garfinkle | 266/226 |
| 3,358,982 | 12/1967 | Penn | 266/226 |
| 3,912,243 | 10/1975 | Chang | 266/226 |
| 4,405,365 | 9/1983 | Robert | 266/225 |

FOREIGN PATENT DOCUMENTS

| 218553 | 12/1961 | Austria | 266/226 |
| 935197 | 11/1955 | Fed. Rep. of Germany | 266/226 |
| 1079086 | 4/1960 | Fed. Rep. of Germany | 266/225 |
| 37-9801 | 7/1962 | Japan | 266/226 |
| 51-12563 | 4/1976 | Japan | 373/80 |
| 888634 | 1/1962 | United Kingdom | 266/225 |
| 250193 | 7/1970 | U.S.S.R. | 266/225 |

Primary Examiner—L. Dewayne Rutledge
Assistant Examiner—Robert L. McDowell
Attorney, Agent, or Firm—Bachman & LaPointe

[57] ABSTRACT

A multi-purpose pyrometallurgical process enhancing device for metallurgical furnaces can be employed in oxy-fuel burner mode for preheating and melting of solid charge, in an oxygen injecting lance mode for decarburization of molten metal in metallurgical furnaces, in particular in melting electric arc furnaces, plasma arc furnaces and basic oxygen furnaces, and in an injector mode for injecting solid materials; the device includes a pivotally mounted water cooled generally arcuate body which can be pivoted into and out of a furnace vessel through a small opening in the shell wall for optimal positioning of the oxy-fuel flame against solid charge, in the burner mode; or injection of oxygen vertically downwardly into the molten metal at supersonic speed, in the oxygen lance mode; in one embodiment the arcuate body can be rotated about its longitudinal axis for directing the oxy-fuel flame towards a cold spot in the furnace; the tip of the arcuate body includes a replaceable, multi-opening nozzle, mounted in a retracted position inside the tip.

18 Claims, 14 Drawing Figures

MULTI-PURPOSE PYROMETALLURGICAL PROCESS ENHANCING DEVICE

BACKGROUND OF THE INVENTION i. Field of the Invention

This invention relates to a multi-purpose pryometallurgical process enhancing device for delivering at least one fluid to the interior of a metallurgical furnace; more especially the invention is concerned with such a device which will function as an oxygen lance and as an oxy-fuel burner.

ii. Description of the Prior Art

Electric arc furnaces are increasingly employed in the manufacture of steel, and the use of oxy-fuel burners to provide a source of auxiliary heat in electric arc furnaces is also common. Oxy-fuel burners are employed in electric arc furnaces to increase the total heat input to a low power furnace; to heat up the cold spots, particularly in a high power furnace so as to promote uniform melting; and to offset the effects of maximum demand control on electricity supplies.

The location of the oxy-fuel burners is determined by the need to avoid other fittings on the furnace shell. Conventionally the burners are mounted on a carriage by means of which they are inserted into the furnace through the furnace wall and retracted from the furnace, the burner axis being inclined downwardly to direct the burner nozzle towards the molten contents.

With conventional oxy-fuel burners the burner axis is typically inclined at an angle of up to about 30° to the horizontal axis of the furnace. Furthermore, in order that the burner flame not contact the centrally disposed carbon electrodes, and in order to obtain the desired distance between the metal melt and the burner nozzle, the burners do not enter or enter only a very short distance into the furnace, in the vicinity of the furnace wall and in a lower part of the furnace wall.

It is also customary to employ an oxygen lance in the refining of steel in a direct arc Electric Arc Furnace, especially to reduce the carbon content of the steel. Typically, in an Electric Arc Furnace, the oxygen lance is introduced through the side wall, for example, through the furnace slag door and the longitudinal axis of the lance is inclined to the horizontal. The optimum disposition of an oxygen lance is a vertical position whereby the jet of oxygen, typically delivered at supersonic velocity, is directed vertically downwardly towards the melt. In existing designs of Electric Arc Furnace, however, it is not practical to introduce the oxygen lance vertically downwardly through the roof because of the necessary length of the lance body, the roof support and the electrode support structures located above the roof, which occupy much of the space above the roof.

It has been suggested in U.S. Pat. No. 3,197,539 to introduce oxy-fuel burners through the roof of an Electric Arc Furnace but this proposal has not been exploited commercially in view of the lack of free space above the roof of an Electric Arc Furnace for mounting of the burners, their support structures and oxygen and fuel lines.

Steel is also produced in a top blown BOF (Basic Oxygen Furnace) process. In such a furnace oxygen is introduced vertically downwardly towards the molten metal through the roof of the furnace through a large oxygen lance; this lance is long and cumbersome and requires heavy support structures to raise and lower it.

Both the top blown BOF and the direct arc steel making Electric Arc Furnace employ a charge which includes a major amount of scrap which initially occupies a much greater volume of the furnace than after it has been melted.

Oxy-fuel burners and oxygen lances are typically employed at different stages of the treatment in an Electric Arc Furnace and have conventionally been separate items of equipment with their own support structures.

The nozzle of oxy-fuel burners of known design, has a limited life and in conventional practice when the nozzle is degraded or burnt out, the nozzle end or tip is cut away and a new end or tip is welded in its place, thus representing complicated and costly maintenance.

SUMMARY OF THE INVENTION

It is an object of this invention to provide a multi-purpose pyrometallurgical process enhancing device which will function both as an oxy-fuel burner and as an oxygen lance.

It is also an object of this invention to provide such a device wherein the nozzle of the device may assume a disposition so as to direct the oxygen in the lance mode vertically downwardly, and direct and position the flame in the burner mode in an optimal position against the solid charge.

It is yet another object of this invention to provide a removable insert for the nozzle of such a device, whereby a worn insert can be readily removed and a new insert readily introduced in its place.

It is still another object of this invention to provide a method of refining metal in an Electric Arc Furnace.

It is yet another object of this invention to provide a method of refining metal in a top blown Basic Oxygen Furnace.

Another object of this invention is to provide a method of introducing auxilliary heat in an Electric Arc Furnace.

In this specification the term 'fluid' contemplates gases, liquids and particulate material in a gaseous stream.

Thus, in accordance with one aspect of the invention there is provided a multi-purpose pyrometallurgical process enhancing device for delivering at least one fluid into a metallurgical furnace comprising: an elongated generally arcuate body having passage means therein for flow of at least one fluid along the body length from an inlet end to an outlet end, said body being pivotally mounted for pivotal movement of said body along an arcuate path such that said outlet end can travel into and out of a metallurgical furnace along said arcuate path.

In accordance with another aspect of the invention there is provided a method of introducing oxygen into molten steel in a metallurgical furnace comprising: providing a metallurgical furnace having a furnace wall, a furnace floor and a furnace roof, feeding oxygen through said furnace wall and ejecting the oxygen vertically downwardly.

In yet another aspect of the invention there is provided a method of providing auxilliary heat in an Electric Arc Furnace for treating molten metal comprising: providing an Electric Arc Furnace having a furnace wall, a furnace floor and a furnace roof, feeding oxygen and a combustible fluid fuel through said furnace wall along an arcuate path, burning said fuel in said oxygen to form a flame and directing said flame towards the metal.

In still another aspect of the invention there is provided a removable nozzle for ejection of separately flowing fluids comprising: a nozzle body having means to temporarily engage a fluid delivery body, said nozzle body having an inlet end and an outlet end, at least one inner fluid passage extending from said inlet end and communicating with at least one inner fluid outlet port at said outlet end, at least one outer fluid passage communicating with at least one outer fluid port at the outlet end, and a gasket on said inner end adapted to gas tightly seal said nozzle in said fluid delivery body against direct fluid flow communication between the inner and outer fluid passages.

BRIEF DESCRIPTION OF THE DRAWINGS

The invention is illustrated in particular and preferred embodiments by reference to the accompanying drawings in which.

DETAILED DESCRIPTION OF PREFERRED EMBODIMENTS WITH REFERENCE TO THE DRAWINGS

Figure 1:
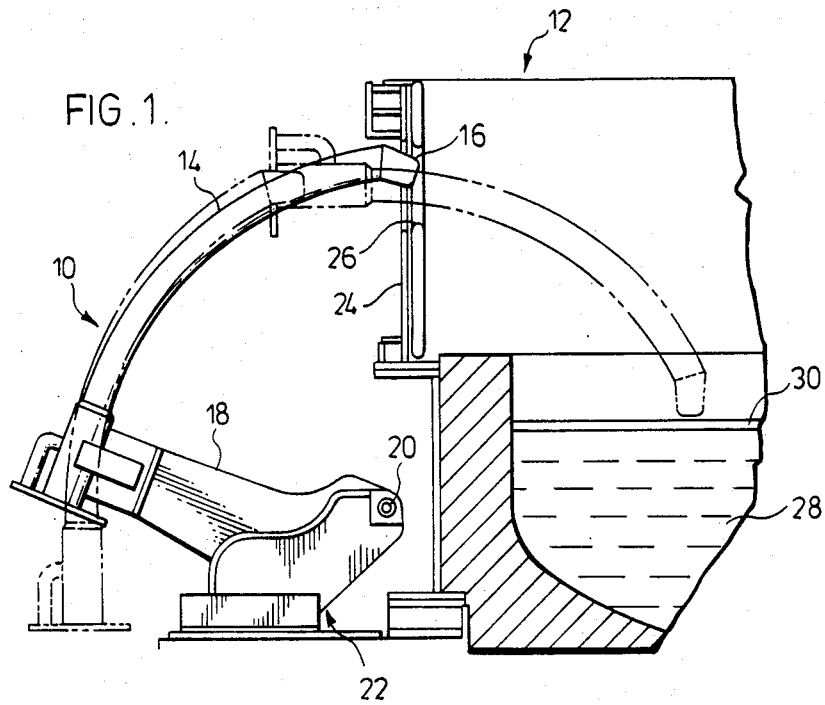
FIG. 1 is a schematic side view of a device of the invention in conjunction with a metallurgical furnace.

With reference to FIG. 1 there is illustrated schematically a multi-purpose pyrometallurgical process enhancing device 10 of the invention, in conjunction with a metallurgical furnace 12.

Injection device 10 includes an elongated arcuate body or lance 14, hereinafter referred to as a lance for convenience, supported on a lever 18 at one end and having a nozzle 16 at the other end. Lever 18 is pivotally mounted at pivot 20 on support base 22.

Furnace 12 includes a furnace wall 24 having a generally oval shaped entrance port 26. Furnace 12 contains a molten metal bath 28 and a layer of slag 30.

The lance 14 is movable along an essentially arcuate path by pivoting it on lever 18 about pivot 20. Lance 14 is shown in FIG. 1 in dotted outline in its two extreme positions, the first wherein lance 14 is completely outside of furance 12 and the second in which it is fully pivotted through entrance port 26 so that nozzle 16 is disposed above the surface of slag 30 and is disposed vertically downwardly. Injection device 10 is shown in solid outline in a configuration between the two extremes shown in dotted outline, wherein lever 18 is pivoting about pivot 20 and nozzle 16 is passing through entrance port 26.

Figure 2A:
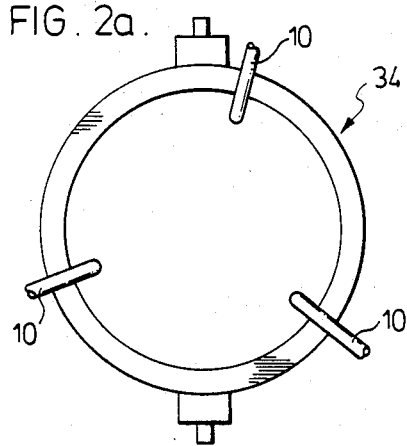
FIG. 2a is a schematic plan view of a BOF top blown furnace employing devices of the invention.

With reference to FIG. 2a, BOF top blown furnace 34 comprises three multi-purpose devices 10 symmetrically arranged about furnace 34 and employed in the oxygen lance mode as a replacement for the conventional centrally located, long, heavy, oxygen lance normally employed.

Figure 2B:
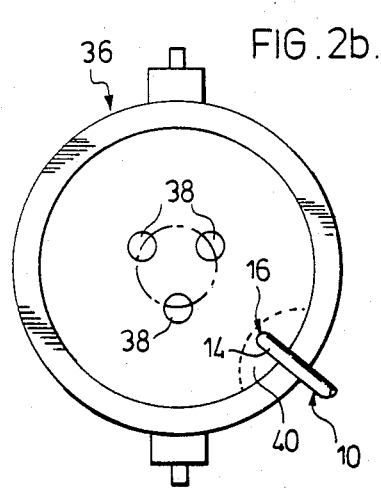
FIG. 2b is a schematic plan view of an Electric Arc Furnace employing a device of the invention.

With further reference to FIG. 2b, an Electric Arc Furnace 36 has three electrodes 38. A device 10 has its lance 14 rotated such that nozzle 16 is directed towards a cold spot 40.

Figure 3:
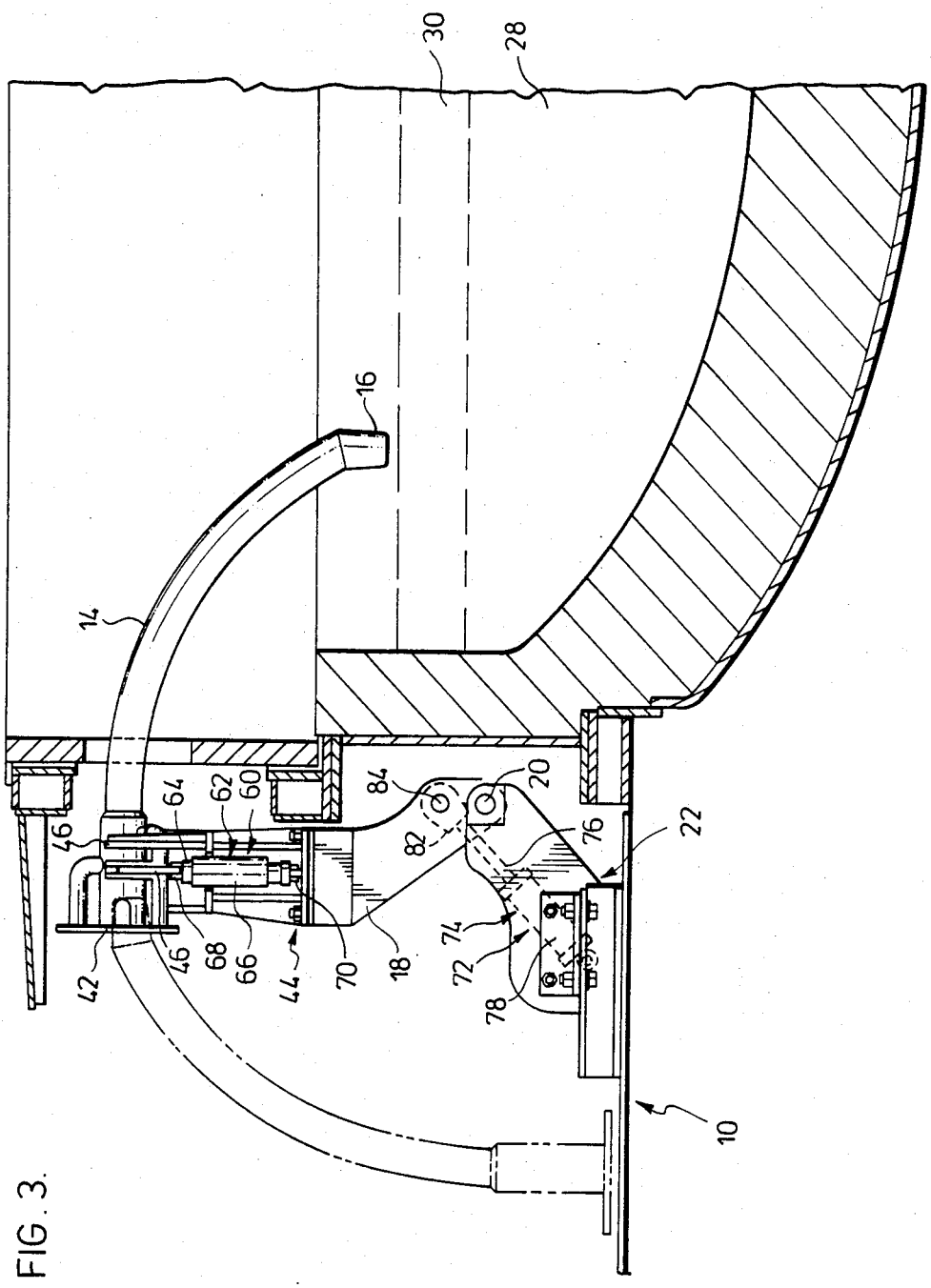
FIG. 3 is a front elevation of the device of the invention in a first embodiment.
Figure 4:
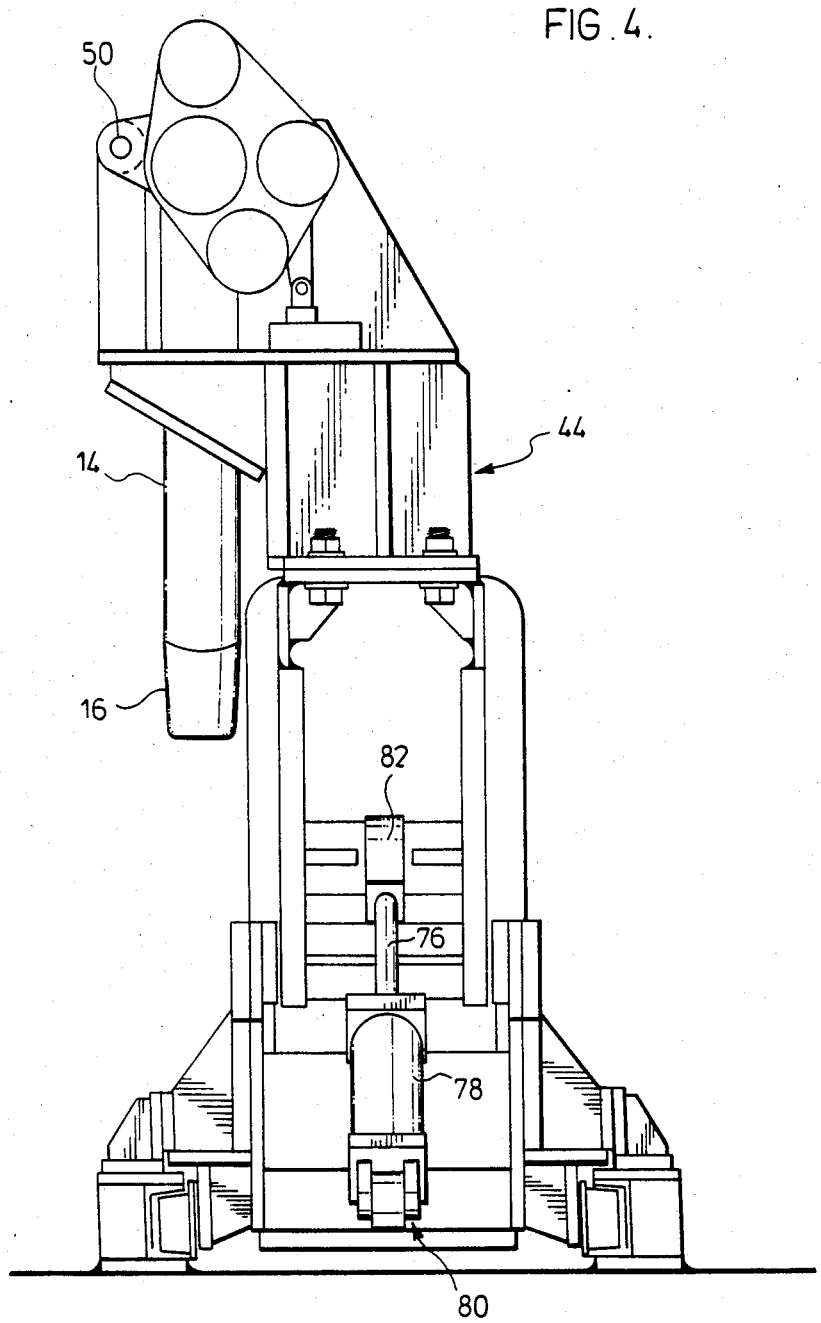
FIG. 4 is a rear end elevation of the device of FIG. 3.
Figure 5:
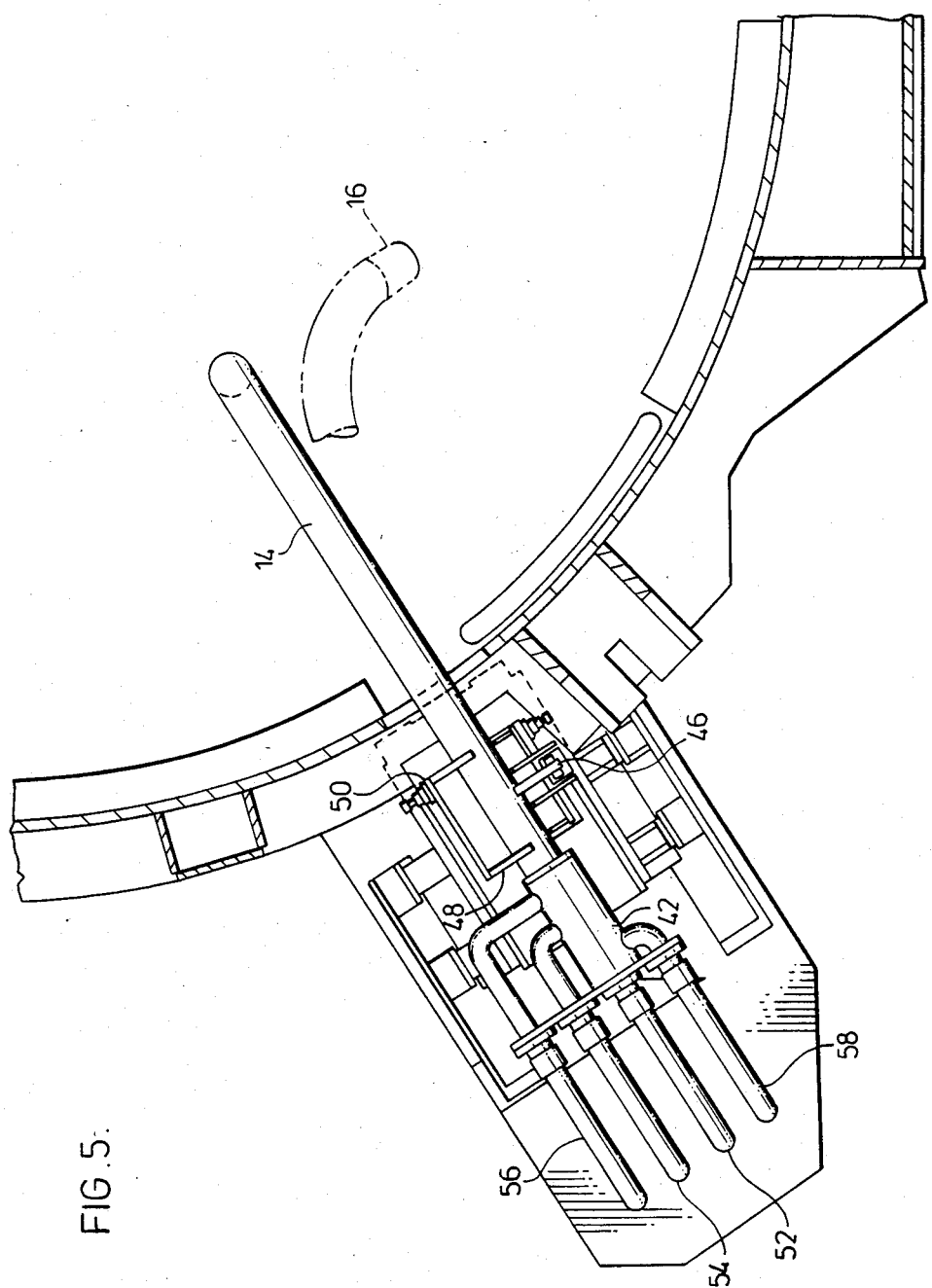
FIG. 5 is a plan view of the device of FIG. 3.

With further reference to FIGS. 3, 4 and 5, there is shown in greater detail a view of device 10 schematically shown in FIG. 1.

The lever 18 includes a support frame 44 having a lance pivot 50 on which brackets 46 and 48 are pivotally mounted. The inlet head 42 of lance 14 is mounted in brackets 46 and 48.

Inlet head 42 includes an oxygen inlet line 52, a fuel inlet line 54, a water inlet line 56 and a water outlet line 58.

Mounted on lever 18 is a lance rotating mechanism 60 comprising a hydraulic cylinder 62 which includes a piston 64 and a cylinder 66. Piston 64 is connected by an upper link 68 to brackets 46 and 48 and cylinder 66 is connected by a lower link 70 to lever 18.

Support base 22 includes a lance pivoting mechanism 72 comprising a hydraulic cylinder 74, including a piston 76 and a cylinder 78. Cylinder 78 is connected to support base 22 by a link 80 and piston 76 is connected to lever 18 through a bearing 82 on a shaft 84.

In operation, device 10 is mounted in close proximity to a metallurgical furnace 12 as in FIG. 1.

Activation of lance pivoting mechanism 72 raises lever 18 from the lowered position shown in broken line in FIG. 3 to the raised position shown in solid line in FIG. 3. During elevation of lever 18 lance 14 follows an essentially arcuate path through entrance port 26 (FIG. 1) into the interior of the furance 12 (FIGS. 1 and 3).

In the fully extended raised position of lever 18 as shown in FIGS. 1 and 3, the nozzle 16 of lance 14 is disposed vertically downwardly with the plane of its outlet in an essentially horizontal plane and gas ejected from nozzle 16 into the furnace is ejected in a vertically downward direction.

After nozzle 16 has passed through entrance port 26 into the interior of the furnace (FIGS. 1 and 3), the lance rotating mechanism 60 may be activated. Travel of piston 64 out of cylinder 66 causes rotation of lance inlet head 42 above pivot 50 up to 45° whereby nozzle 16 is directed outwardly towards the adjacent furnace wall (see FIG. 2b).

If device 10 is in the oxygen-burner mode, it can be used to burn its way through a scrap metal charge in furnace 12 and the lance rotating mechanism 60 may be employed to direct the flame from side to side in a moving arc as lance 14 travels along its arcuate path through entrance port 26, with the elevation of lever 18. In the fully extended configuration of device 10 wherein lance 14 is fully within the furnace, the lance rotating mechanism 60 can be employed to direct the nozzle 16 to a known cold spot, such as the cold spot 40 in the electric arc furnace 36 in FIG. 2b.

In such a case the site of the cold spot of the furnace is to be determined in advance and the point of entry of lance 14 in the wall of the furnace is located so that a nozzle 16 can be directed to such cold spot to provide additional heat in the zone in which it is needed and thereby improve the efficiency of the furnace.

After use as an oxygen-burner in the furnace 12, the device 10 may be withdrawn and re-introduced into the oxygen-lance mode in a final decarbonization stage. For this purpose the lance 14 is withdrawn from the furnace 12, the burner flame at nozzle 16 is extinguished and the fuel inlet line 54 is closed. The lance 14 is then re-introduced through port 26 along its arcuate path, into furnace 12 by raising lever 18 with lance pivoting mechanism 72. In this case the lance rotating mechanism 60 is not employed and in the fully extended position nozzle 16 is directed vertically downwardly to eject oxygen vertically downwardly under high pressure into the metal bath 28.

Thus, the device 10 can be employed both as an oxy-fuel burner and an oxygen lance in different stages of the metallurgical process. In the oxy-fuel burner mode in an Electric Arc Furnace, the device 10 can be employed to intensify the pre-heating of the solid charge and the melting of the solid charge, and can in particular be directed towards the furnace cold spot by means of lance rotating mechanism 60. Subsequently in the oxygen lance mode, the same device 10 can be employed in a refining stage of the operation to direct a supersonic stream of oxygen vertically downwardly into the bath whereby a vigorous stirring effect is obtained in the molten metal, but with reduced splashing of molten metal onto the walls and roof of the furnace.

Figure 6:
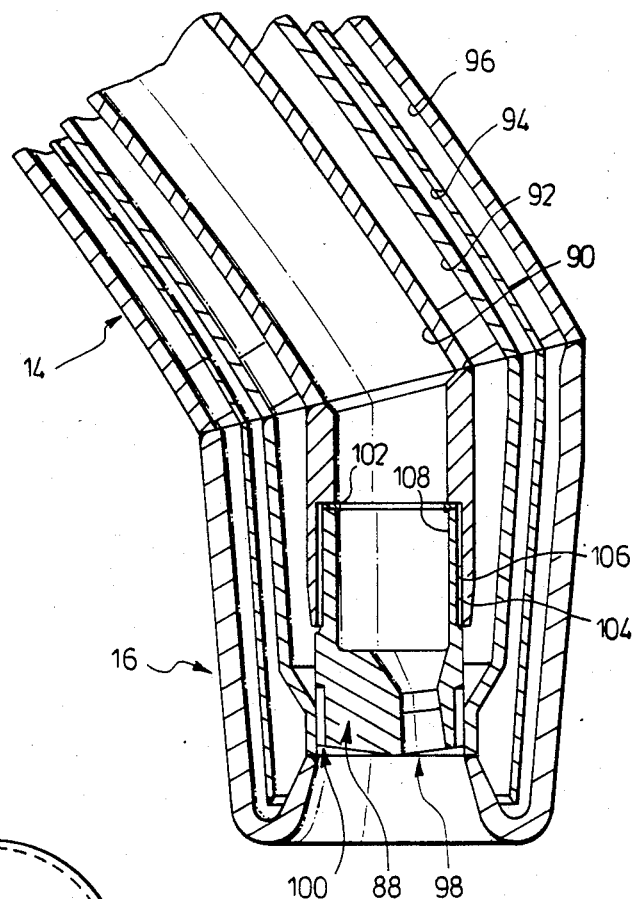
FIG. 6 is a detail in cross-section of the nozzle end of the device of FIG. 3.

With further reference to FIG. 6, there is shown a detail of the nozzle end of lance 14 in which nozzle 16 of lance 14 includes a nozzle insert 88. Lance 14 and nozzle 16 include a central oxygen passage 90, a fuel passage 92 surrounding oxygen passage 90, a water-in passage 94 surrounding fuel passage 92 and a water-out passage 96 surrounding water-in passage 94. Oxygen passage 90 communicates with oxygen outlets 98 of which one is shown in FIG. 6 and fuel passage 92 communicates with fuel outlets 100.

Nozzle insert 88 has an outer thread 104 which engages a threaded wall 106 of oxygen passage 90.

Nozzle insert 88 includes an inlet end 108 on which is secured a gasket 102 to provide a seal between nozzle insert 88 and oxygen passage 90.

Figure 7:
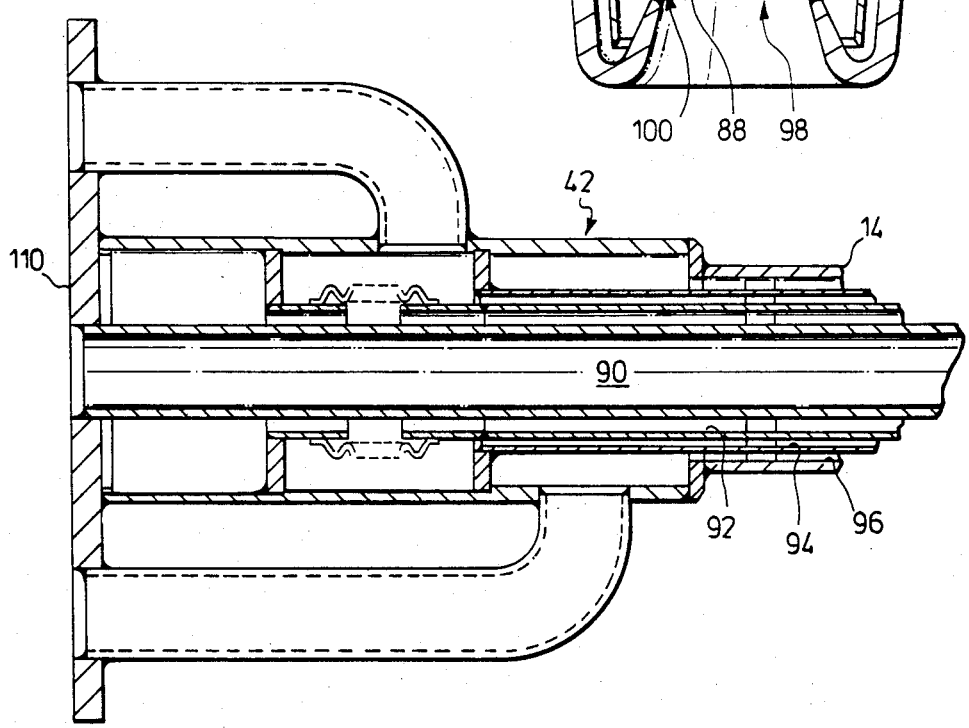
FIG. 7 is a detail in cross-section of the inlet end of the device of FIG. 3.

With reference to FIG. 7 there is shown the inlet end 110 of inlet head 42 of lance 14 wherein can be seen the inlet ends of central oxygen passage 90, fuel passage 92, water-in passage 94 and water-out passage 96, which in turn communicate with oxygen inlet line 52, fuel inlet line 54, water inlet line 56 and water outlet line 58, shown in FIG. 5.

Figure 8:
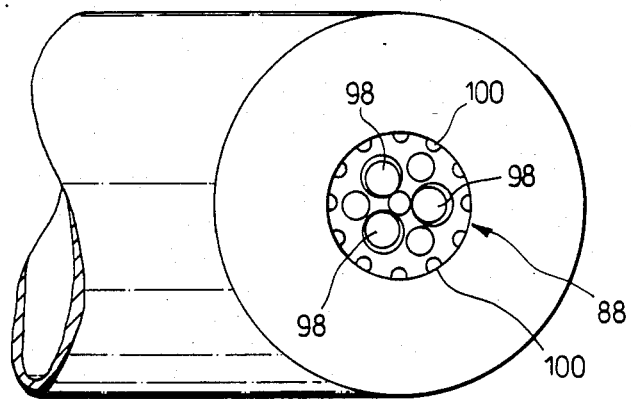
FIG. 8 is a plan view of the nozzle end of FIG. 6.

With reference to FIG. 8 there can be seen the three oxygen outlets 98 of nozzle insert 88 and the plurality of fuel outlets 100.

Figure 9:
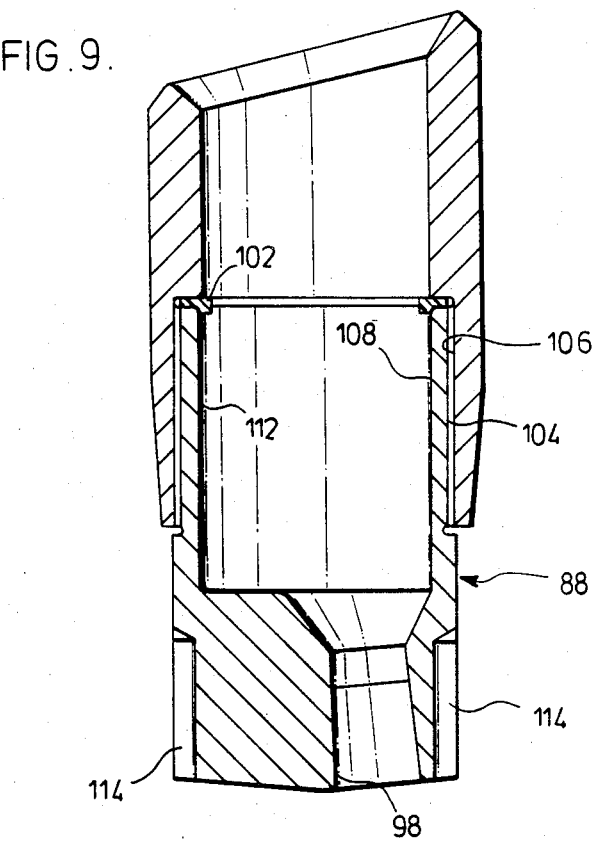
FIG. 9 is a cross-sectional elevation of the nozzle device of the nozzle end in FIG. 6.

With reference to FIG. 9 there can be seen in greater detail nozzle insert 88 having a nozzle body with an inlet end 108 with gasket 102 thereon and thread 104 adjacent the inlet end 108, and an outlet end. Nozzle insert 88 includes a central oxygen passage 112 and a plurality of slots or channels 114 which together with the outer wall of fuel passage 92 form the fuel outlets 100 at the outlet end which directs fuel externally of the outlet end. Thread 104 is formed in a first part of the nozzle body outer wall adjacent inner end 108 and the slots or channels 114 are formed in a second part of the nozzle body outer wall adjacent the outer end.

Figure 10:
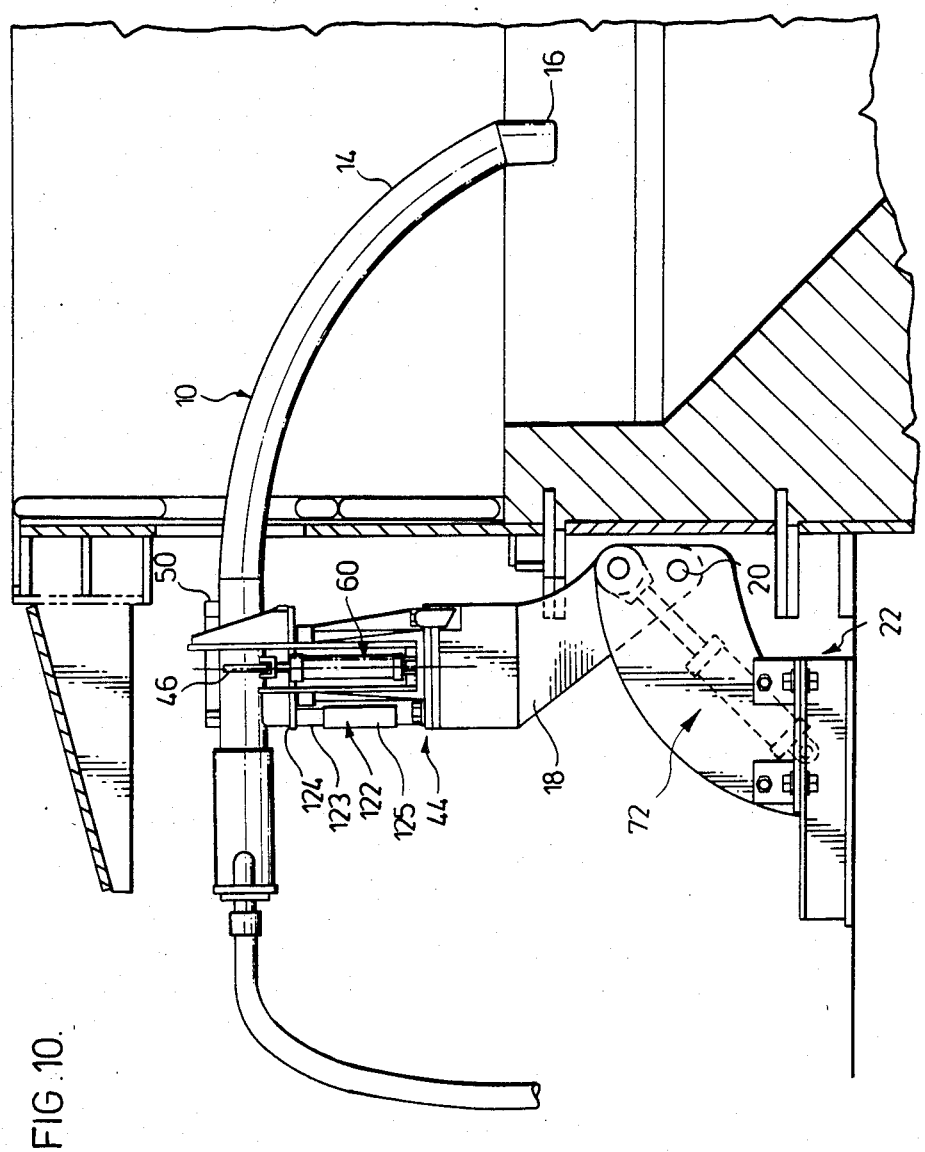
FIG. 10 is a front elevation similar to FIG. 3 of the device of the invention in a second embodiment.

With further reference to FIG. 10 there is shown a second embodiment of the multi-purpose device of the invention in which similar parts are identified by the same numerals as in FIG. 3. The multi-purpose device 10 in FIG. 10 differs from that in FIG. 3 in that support frame 44 includes a platform 124 with lance pivot 50 and brackets 46 and 48 being mounted on platform 124. An elevating mechanism 126 is disposed beneath platform 124 and may be employed to elevate platform 124, and with it lance 14, relative to lever 18.

Figure 11:
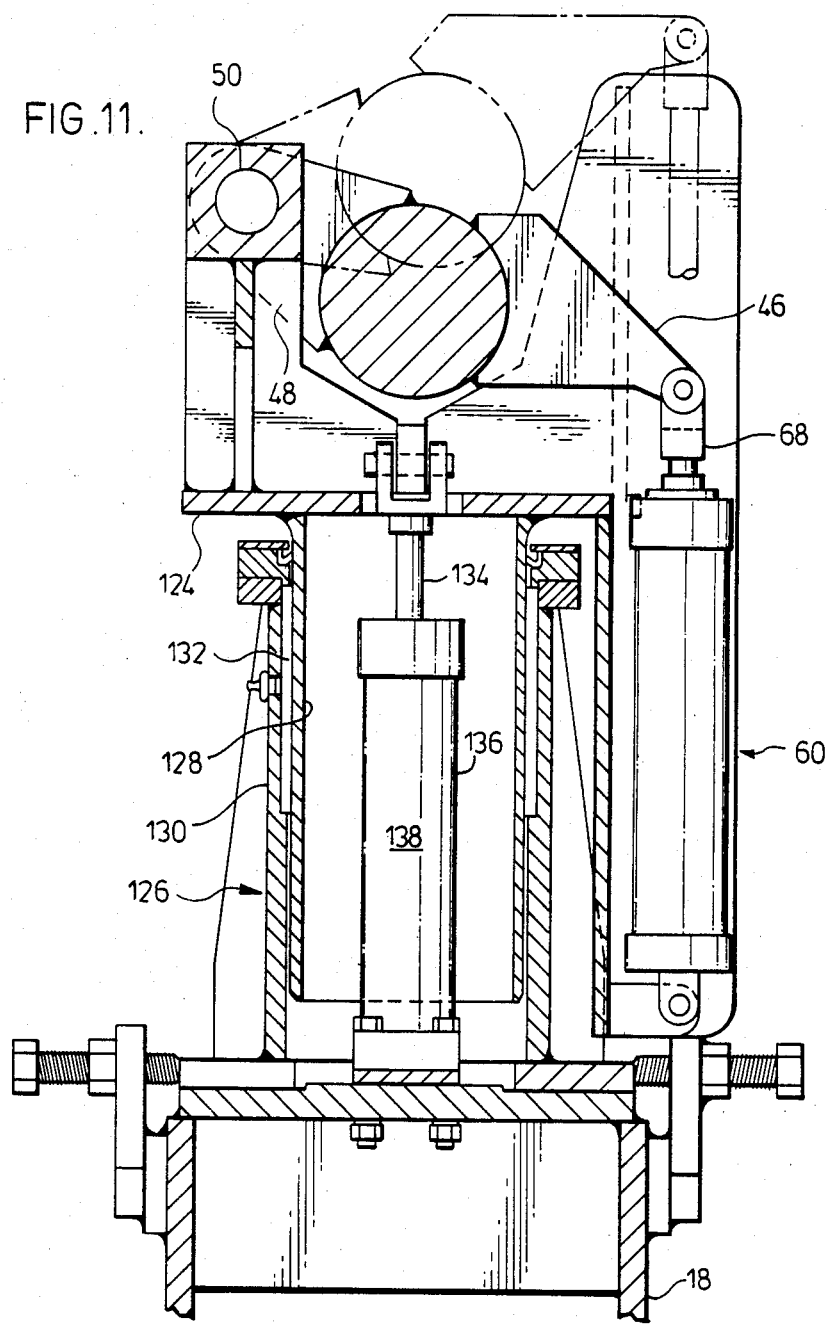
FIG. 11 is a detail in cross-section of a side elevation of the inlet end of the device of FIG. 10, showing the elevating mechanism.

With further reference to FIG. 11 elevating mechanism 126 comprises an inner sleeve 128 secured to the underside of platform 124 and an outer sleeve 130 secured to lever 18. A bushing 132 is disposed between sleeves 128 and 130.

A hydraulic cylinder 138 is disposed within inner sleeve 128 and includes a cylinder 136 secured at a lower end to lever 18, with a piston 134 mounted therein and secured at an upper end to the underside of platform 124. Activation of hydraulic cylinder 138 causes piston 134 to rise from cylinder 136 to urge platform 124 vertically upwardly, the vertical, upward movement being guided by inner sleeve 128.

Elevating mechanism 126 includes a guide mechanism 122 (see FIG. 10) disposed between platform 124 and arm 18, including an inner sleeve 123 guided within an outer sleeve 125. Guide mechanism 122 prevents lance 14 rotating about the longitudinal axis of cylinder 136.

By means of elevating mechanism 126, the elevation of nozzle 16 relative to the metal bath in the furnace can be adjusted.

Figure 12:
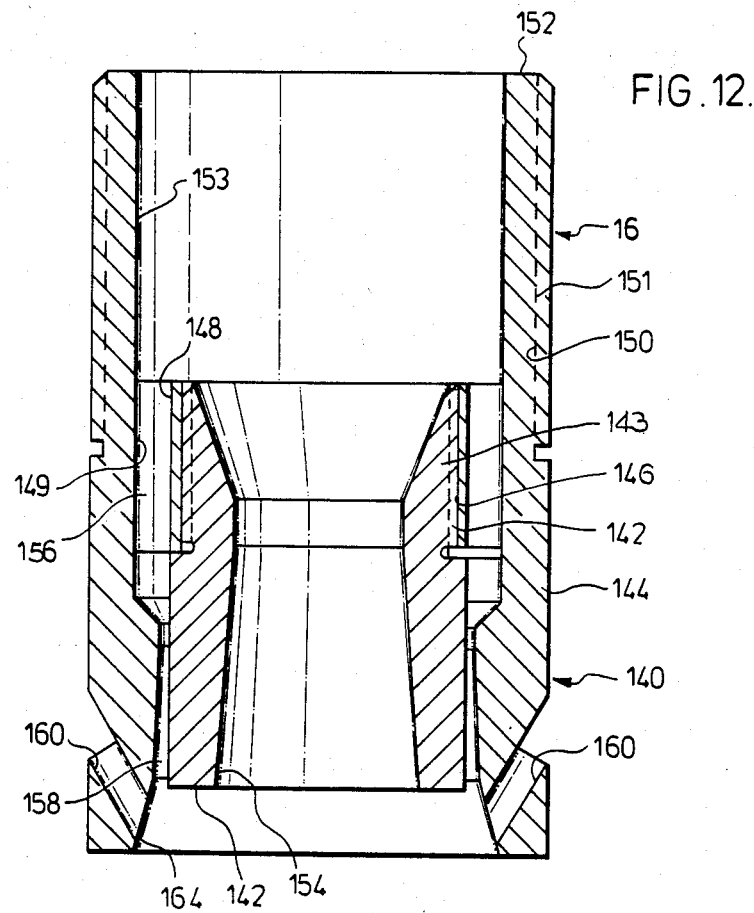
FIG. 12 is a cross-sectional elevation similar to that of FIG. 9 of a nozzle device of the invention in a second embodiment.
Figure 13:
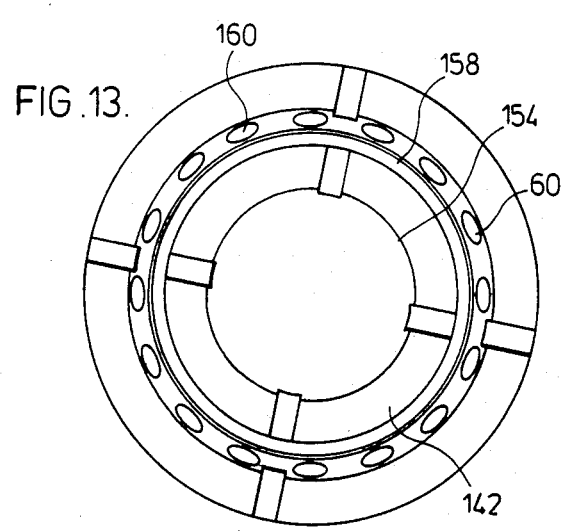
FIG. 13 is a plan view of the nozzle device of FIG. 12.

With reference to FIGS. 12 and 13 a nozzle insert 140 includes an inner component 142 and an outer component 144. Inner component 142 includes a thread 146 which engages a threaded inner wall 143 of outer component 144. Outer component 144 includes a thread 150 for engagement with a threaded interior wall 151 of a nozzle 16 of a lance 14 in a manner similar to that illustrated in FIG. 6.

Outer component 144 includes a gasket 152 and has a central oxygen passage 153 which communicates centrally with a Laval nozzle port 154 of inner component 142. Oxygen passage 153 also communicates with an oxygen passage 156 defined between inner wall 148 and outer wall 149; oxygen passage 156 terminates in an outwardly diverging passage 158. A plurality of inclined fuel ejection ports 160 is disposed in an outer end of outer component 144 and in use will communicate with a fuel passage such as 92 of nozzle 16 in FIG. 6.

The nozzle insert 140 can be employed in both the oxy-burner mode and the oxygen lance mode of the lance 14, but has a particular advantage in the oxygen-lance mode. In the oxygen-lance mode no fuel is ejected through ports 160 and there is thus a tendency for particulate material in the furnace atmosphere, for example, iron oxide particles to be drawn into the fuel ejection ports 160 and cause clogging which necessitates a cleaning operation prior to adjustment of the oxy-fuel burner mode. This is a disadvantage with the nozzle device in the nozzle end as illustrated in FIG. 6. In the nozzle insert 140 oxygen passes through central oxygen passage 153 whereafter a major portion of the oxygen travels through Laval nozzle port 154 with the remainder travelling through passage 156 and thence through diverging passage 158. With the outward divergence at 164 of the interior wall 149 of outer component 144 across ejection ports 160, a stream of oxygen from diverging passage 158 travels across the outer ends of fuel ports 160 and sweeps particulate material away.

Another solution to the clogging problem in the oxygen lance mode is to feed a small amount of fuel through the lance even in the oxygen lance mode, to sweep away particulate material at the fuel outlet ports 160.

The lance 14 is generally arcuate having a radius of curvature slightly greater than the radius of the arcuate path defined by pivotting lever 18 about pivot 20.

The multi-purpose pyrometallurgical process enhancing device of the invention can be employed to introduce or inject additives, in a gaseous stream, to a metallurgical furnace, such addition includes particulate lime and particulate carbon.

We claim:

1. In a method of operating a top blown Basic Oxygen Furnace in which oxygen is ejected vertically downwardly towards a charge in the Furnace, the improvement comprising:
   providing a plurality of combination oxy-fuel burner and oxygen lance devices, each device comprising an elongate arcuate body having an inlet end and an outlet end;
   a support arm, said body being supported on said susspport arm adjacent said inlet end;
   a support base, said arm being pivotally mounted on said support based;
   means connected between said support arm and said support base to pivotally move said arm with said body relative to said support base, along an arcuate path between a lowered and a raised position;
   said elongate body having defined therein an inner generally central passage for flow of oxygen and an outer fuel passage surrounding said oxygen passage, said oxygen and fuel passages extending from said inlet end to said outlet end; said central passage having an inner wall and said outer passage having an inner wall;
   a water in-flow passage and a water out-flow passage extending from said inlet end to said outlet end in spaced apart concentric side-by-side relationship and surrounding said fuel passage;
   said in-flow passage and said out-flow passage communicating adjacent said outlet end to define a path for flow of water from said inlet end, along said in-flow passage to said outlet end and from said outlet end along said out-flow passage to said inlet end, and
   a nozzle body in said outlet end having a nozzle body outer wall,
   said nozzle body having a nozzle inlet end and a nozzle outlet end and said nozzle body outer wall having a first part adjacent said nozzle inlet end and a second part adjacent said nozzle outlet end,
   at least one nozzle oxygen passage extending from said nozzle inlet end to said nozzle outlet end, said at least one nozzle oxygen passage being in gas flow communication with said central passage,
   means in said first part of said nozzle body outer wall engaging said inner wall of said inner central passage,
   at least one channel defined in said second part of said outer nozzle body wall, said at least one channel terminating adjacent said nozzle outlet end and providing gas flow communication between said outer fuel passage and said nozzle outlet end,
   means tightly sealing said nozzle in said fluid delivery body against direct fluid flow communication between the central oxygen passage and the outer fuel passage of said arcuate body,
   said devices being spaced apart, circumferentially of said Furnace,
   pivoting the arcuate bodies of said devices through a wall of the Furnace by a predetermined amount until the outlet ends of the devices are disposed above said charge,
   feeding oxygen through the central passage of each device and ejecting it vertically downwardly from said outlet end, said oxygen feed through said central passages being the sole oxygen feed to said Furnace.

2. A method of operating a metallurgical furnace comprising:
   (i) providing a metallurgical furnace having a furnace wall, a furnace floor and a furnace roof, with a metallurgical charge housed therein,
   (ii) providing a combination oxy-fuel burner and oxygen lance device comprising:
      an elongate arcuate body having an inlet end and and outlet end;
      a support arm, said body being supported on said support arm adjacent said inlet end;
      a support base, said arm being pivotally mounted on said support base;
      means connected between said support arm and said support base to pivotally move said arm with said body relative to said support base, along an arcuate path between a lowered and a raised position;
      said elongate body having defined therein an inner generally central passage for flow of oxygen and a fuel passage surrounding said oxygen passage, said oxygen and fuel passages extending from said inlet end to said outlet end;
      a water in-flow passage and a water out-flow passage extending from said inlet end to said outlet end in spaced apart concentric side-by-side relationship and surrounding said fuel passage; and
      said in-flow passage and said out-flow passage communicating adjacent said outlet end to define a path for flow of water from said inlet end, along said in-flow passage to said outlet end and from said outlet end along said out-flow passage to said inlet end, said elongate arcuate body being pivotally mounted adjacent said furnace,
   (iii) pivoting said arcuate body through said furnace wall a predetermined amount, until said outlet end is disposed above said charge,
   (iv) feeding oxygen through said central passage and fuel through said fuel passage to supply a flame at said outlet end to heat said charge in an oxy-burner mode,
   (v) circulating water along said path to cool said device, and, subsequently
   (vi) discontinuing the feed of fuel in said fuel passage and feeding oxygen in said central passage to eject oxygen at said outlet end in an oxygen lance mode.

3. A method according to claim 2, wherein in said oxy-burner mode said flame is directed to a furnace cold spot in a predetermined location.

4. A method according to claim 2, wherein step (vi) comprises pivoting said arcuate body out of said furnace, through said furnace wall, discontinuing the feed of oxygen and fuel to extinguish the flame, pivoting said arcuate body back through said furnace wall by a predetermined amount and recommencing feed of oxygen to said central passage.

5. A method according to claim 2, wherein said furnace is an Electric Arc Furnace.

6. A combination oxy-fuel burner and oxygen lance device comprising:
an elongate arcuate body having an inlet end and an outlet end;
a support arm, said body being supported on said support arm adjacent said inlet end;
a support base, said arm being pivotally mounted on said support base;
means connected between said support arm and said support base to pivotally move said arm with said body relative to said support base, along an arcuate path between a lowered and a raised position;
said elongate body having defined therein an inner generally central passage for flow of oxygen and an outer fuel passage surrounding said oxygen passage, said oxygen and fuel passages extending from said inlet end to said outlet end; said central passage having an inner wall and said outer passage having an inner wall;
a water in-flow passage and a water out-flow passage extending from said inlet end to said outlet end in spaced apart concentric side-by-side relationship and surrounding said fuel passage;
said in-flow passage and said out-flow passage communicating adjacent said outlet end to define a path for flow of water from said inlet end, along said in-flow passage to said outlet end and from said outlet end along said out-flow passage to said inlet end, and
a nozzle body in said outlet end having a nozzle body outer wall,
said nozzle body having a nozzle inlet end and a nozzle outlet end and said nozzle body outer wall having a first part adjacent said nozzle inlet end and a second part adjacent said nozzle outlet end,
at least one nozzle oxygen passage extending from said nozzle inlet end to said nozzle outlet end, said at least one nozzle oxygen passage being in gas flow communication with said central passage,
means in said first part of said nozzle body outer wall engaging said inner wall of said inner central passage,
at least one channel defined in said second part of said outer nozzle body wall, said at least one channel terminating adjacent said nozzle outlet end and providing gas flow communication between said outer fuel passage and said nozzle outlet end, and
means tightly sealing said nozzle in said fluid delivery body against direct fluid flow communication between the central oxygen passage and the outer fuel passage of said arcuate body.

7. A device according to claim 6, further including a nozzle insert removably seated in said outlet end and having at least one oxygen outlet port communicating with said central passage, and at least one fuel outlet port communicating with said fuel passage.

8. A device according to claim 6, wherein said outlet end comprises a tip angled relative to the arcuate body such that when said support arm is in said raised position, said tip is adapted to be disposed vertically downwardly so as to direct said at least one fluid, vertically downwardly.

9. A device according to claim 8, wherein said body is pivotally mounted on said support arm for pivotal movement of said body along its length, relative to said support arm, and including means to pivot said body on said support arm.

10. A device according to claim 6, wherein said support arm includes an upper support platform and a lower support member, and said body is mounted on said platform, said platform being vertically movable relative to said lower support member and means to vertically move said platform relative to said lower support member.

11. In combination an electric arc furnace and at least one device as set forth in claim 6,
said at least one device being mounted for pivotal movement of said arcuate body through a wall of said furnace by a predetermined amount, until said outlet end is disposed above a charge in said furnace.

12. A combination oxy-fuel burner and oxygen lance comprising:
an elongate arcuate body having an inlet end and an outlet end;
a support arm, said body being supported on said support·arm adjacent said inlet end;
a support base, said arm being pivotally mounted on said support base;
hydraulic cylinder means connected between said support arm and said support base to pivotally move said arm with said body relative to said support base, along an arcuate path between a lowered and a raised position;
said elongate body having defined therein an inner generally central passage for flow of oxygen and an outer fuel passage surrounding said oxygen passage, said oxygen and fuel passages extending from said inlet end to said outlet end; said central passage having an inner wall and said outer passage having an inner wall;
a water in-flow passage and a water out-flow passage extending from said inlet end to said outlet end in spaced apart side-by-side relationship and surrounding said fuel passage;
said in-flow passage and said out-flow passage communicating adjacent said outlet end to define a path for flow of water from said inlet end, along said in-flow passage to said outlet end and from said outlet end along said out-flow passage to said inlet end; and
a nozzle insert removably gas tightly fastened in said outlet end and having at least one oxygen outlet port communicating with said central passage, and at least one fuel outlet port communicating with said fuel passage;
said outlet end being angled relative to the arcuate body such that when said support arm is in said raised position said oxygen and fuel outlet ports are adapted to be disposed vertically downwardly; and
said nozzle insert comprising a nozzle having a nozzle body outer wall,
said nozzle body having a nozzle inlet end and a nozzle outlet end and said nozzle body outer wall having a first part adjacent said nozzle inlet end and a second part adjacent said nozzle outlet end;
at least one nozzle oxygen passage extending from said nozzle inlet end to said nozzle outlet end, said at least one nozzle oxygen passage being in gas flow communication with said central passage, means in said first part of said nozzle body outer wall engaging said inner wall of said inner central passage, at least one channel defined in said second part of said outer nozzle body wall, said at least one channel terminating adjacent said nozzle outlet end and providing gas flow communication between said outer fuel passage and said nozzle outlet end.

13. A combination burner and lance according to claim 12, wherein said nozzle insert is threadedly fastened in said arcuate body outlet end and said nozzle insert includes a gasket adapted to gas tightly seal said insert in said outlet end of said arcuate body against direct fluid flow communication between the oxygen passage and the fuel passage, in said arcuate body.

14. A combination burner and lance according to claim 13, further including, a pivot member on said support arm and a bracket means pivotally mounted to said pivot member, said elongate body being supported in said bracket means for pivotal movement about its elongate axis, and second hydraulic cylinder means connected between said bracket means and said support arm to pivotally move said body relative to said support arm, about said pivot member.

15. A combination burner and lance according to claim 13, wherein said support arm includes an upper platform and a lower support member, said pivot member being mounted on said platform, and third hydraulic cylinder means between said platform and said lower support member adapted to vertically move said platform relative to said lower support member.

16. A removable nozzle for ejection of separately flowing fluids comprising:

a nozzle body having a nozzle body outer wall;

said nozzle body having an inlet end and an outlet end and said nozzle body outer wall having a first part adjacent said inlet end and a second part adjacent said outlet end;

at least one inner oxygen passage extending from said inlet end and communicating with at least one oxygen outlet port at said outlet end for flow of oxygen from said inlet end to said outlet end, means in said first part of said nozzle body outer wall for removably engaging a fluid delivery body, at least one channel defined in said second part of said outer nozzle body wall, said at least one channel terminating adjacent said outlet end and adapted to provide gas flow communication between said nozzle outlet end and the fluid delivery body, said channel adapted to direct fuel externally of said outlet end, and a gasket on said inner end adapted to gas tightly seal said nozzle in said fluid delivery body against direct fluid flow communication between the at least one inner oxygen passage and at least one outer fuel passage.

17. A nozzle according to claim 16, wherein said means to removably engage comprises a threaded portion at said inner end of said nozzle body adapted to threadedly engage the fluid delivery body.

18. A nozzle according to claim 16, wherein said nozzle body comprises an inner body member and an outer body member, connecting means for securing said inner body member in said outer body member, said at least one inner oxygen passage comprising a first passage extending through said inner body member and a second passage surrounding said first passage and extending between said inner and outer members, said second passage communicating with said first passage at said outlet end, and said second passage being adapted to flushingly direct oxygen across said at least one outer fuel port.

* * * * *